United States Patent
Yamada et al.

(10) Patent No.: US 11,927,454 B2
(45) Date of Patent: Mar. 12, 2024

(54) INFORMATION PROCESSING DEVICE, INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Takuji Yamada, Musashino (JP); Jun Tsukamoto, Seto (JP); Kaori Sakai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 17/071,494

(22) Filed: Oct. 15, 2020

(65) Prior Publication Data
US 2021/0180969 A1    Jun. 17, 2021

(30) Foreign Application Priority Data

Dec. 11, 2019    (JP) ................................ 2019-223875

(51) Int. Cl.
*G01C 21/36*    (2006.01)
*B60L 50/60*    (2019.01)
(Continued)

(52) U.S. Cl.
CPC .......... *G01C 21/3469* (2013.01); *B60L 50/60* (2019.02); *B60L 53/62* (2019.02);
(Continued)

(58) Field of Classification Search
CPC .. B60L 3/12; B60L 50/60; B60L 53/62; B60L 53/65; B60L 53/66; B60L 53/67; B60L 58/10; B60L 58/12; B60L 2240/622; B60L 2250/12; B60L 2250/20; B60L 2260/52; B60L 2260/58; G01C 21/3469; G01C 21/3605; G01C 21/3626; G01C 21/3679; G01C 21/3697; G01R 31/3647; G01R 31/371; H02J 7/00032;
(Continued)

(56) References Cited

U.S. PATENT DOCUMENTS 10,647,218 B1 * 5/2020 Huang .................. H01M 10/44
2008/0243331 A1    10/2008 Kato
(Continued)

FOREIGN PATENT DOCUMENTS

| JP | 2008-249417 A | 10/2008 |
|---|---|---|
| JP | 2011-102739 A | 5/2011 |

(Continued)

*Primary Examiner* — Peter D Nolan
*Assistant Examiner* — Ce Li Li
(74) *Attorney, Agent, or Firm* — Sughrue Mion, PLLC

(57) ABSTRACT

An information processing device includes a control unit configured to acquire information of a position and information of a travelable range of a vehicle which travels using a battery as an energy source, to extract a charging station located within the travelable range from the position out of a plurality of charging stations, to extract a spot which is able to be visited in a state in which the vehicle stops in the extracted charging station out of a plurality of spots, and to transmit information of the extracted spot along with information of the extracted charging station.

17 Claims, 7 Drawing Sheets

(51) Int. Cl.
  B60L 53/62 (2019.01)
  B60L 53/66 (2019.01)
  B60L 58/10 (2019.01)
  G01C 21/34 (2006.01)
  H02J 7/00 (2006.01)
  G01S 19/42 (2010.01)
  H04L 67/12 (2022.01)

(52) U.S. Cl.
  CPC ............... B60L 53/66 (2019.02); B60L 58/10 (2019.02); G01C 21/3605 (2013.01); G01C 21/3626 (2013.01); H02J 7/0048 (2020.01); G01S 19/42 (2013.01); H04L 67/12 (2013.01)

(58) Field of Classification Search
  CPC ....... H02J 7/0047; H02J 7/0048; H04L 67/12; H04L 67/52; Y02T 10/70; Y02T 10/7072; Y02T 10/72; Y02T 90/12; Y02T 90/14; Y02T 90/16; Y02T 90/167; Y02T 90/169
  See application file for complete search history.

(56) References Cited

U.S. PATENT DOCUMENTS

| | | | |
|---|---|---|---|
| 2011/0032110 A1* | 2/2011 | Taguchi | B60L 3/12 340/636.1 |
| 2013/0226441 A1* | 8/2013 | Horita | B60Q 9/00 701/117 |
| 2014/0340048 A1 | 11/2014 | Tateno et al. | |
| 2015/0266379 A1* | 9/2015 | Bellin | B60K 35/00 701/36 |
| 2016/0165443 A1* | 6/2016 | Baldasare | H04W 4/023 455/411 |
| 2017/0101025 A1* | 4/2017 | Penilla | G06Q 20/102 |
| 2017/0308948 A1* | 10/2017 | Chikkannanavar | B60L 53/14 |
| 2017/0315557 A1* | 11/2017 | Vogt | G05D 1/0242 |
| 2018/0281612 A1* | 10/2018 | Perry | H04W 4/80 |
| 2019/0202304 A1* | 7/2019 | Moghe | B60L 53/36 |
| 2019/0283623 A1 | 9/2019 | Takebayashi | |
| 2019/0351783 A1* | 11/2019 | Goei | B60L 53/63 |
| 2020/0006969 A1* | 1/2020 | Penilla | H04L 67/04 |
| 2020/0217679 A1* | 7/2020 | DeLuca | G01C 21/3484 |

FOREIGN PATENT DOCUMENTS

| | | |
|---|---|---|
| JP | 2011-174711 A | 9/2011 |
| JP | 2019-165541 A | 9/2019 |
| WO | 2013/088569 A1 | 6/2013 |

\* cited by examiner

INFORMATION PROCESSING DEVICE, INFORMATION PROCESSING SYSTEM, PROGRAM, AND INFORMATION PROCESSING METHOD

CROSS-REFERENCE TO RELATED APPLICATION

This application claims priority to Japanese Patent Application No. 2019-223875 filed on Dec. 11, 2019, incorporated herein by reference in its entirety.

BACKGROUND

1. Technical Field

The present disclosure relates to an information processing device, an information processing system, a program, and an information processing method.

2. Description of Related Art

In an electric vehicle that travels using a battery as an energy source, the battery needs to be charged at a charging station before a battery residual capacity becomes zero.

Japanese Unexamined Patent Application Publication No. 2011-102739 (JP 2011-102739 A) discloses a technique of calculating a movable distance which an electric vehicle can travel and extracting a charging station within the movable distance.

SUMMARY

The time which it takes to charge a battery mounted in an electric vehicle or the like is longer than the time which it takes to refuel a gasoline vehicle, and a driver may become bored. It is preferable to provide information allowing a driver to spend a waiting time in which a battery of an electric vehicle is charged meaningfully.

The present disclosure provides information that can allow a driver to spend a waiting time in which a battery of an electric vehicle is charged meaningfully.

According to an aspect of the present disclosure, there is provided an information processing device including a control unit configured to acquire information of a position and information of a travelable range of a vehicle which travels using a battery as an energy source, to extract a charging station located within the travelable range from the position out of a plurality of charging stations, to extract a spot which is able to be visited in a state in which the vehicle stops in the extracted charging station out of a plurality of spots, and to transmit information of the extracted spot along with information of the extracted charging station.

According to another aspect of the present disclosure, there is provided a program causing a computer to perform operations including: acquiring information of a position and information of a travelable range of a vehicle which travels using a battery as an energy source; extracting a charging station located within the travelable range from the position out of a plurality of charging stations; extracting a spot which is able to be visited in a state in which the vehicle stops in the extracted charging station out of a plurality of spots; and transmitting information of the extracted spot along with information of the extracted charging station.

According to another aspect of the present disclosure, there is provided an information processing method in an information processing device, including: acquiring information of a position and information of a travelable range of a vehicle which travels using a battery as an energy source; extracting a charging station located within the travelable range from the position out of a plurality of charging stations; extracting a spot which is able to be visited in a state in which the vehicle stops in the extracted charging station out of a plurality of spots; and transmitting information of the extracted spot along with information of the extracted charging station.

According to the present disclosure, it is possible to provide information that can allow a driver to spend a waiting time in which a battery of an electric vehicle is charged meaningfully.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the accompanying drawings.

Figure 1:
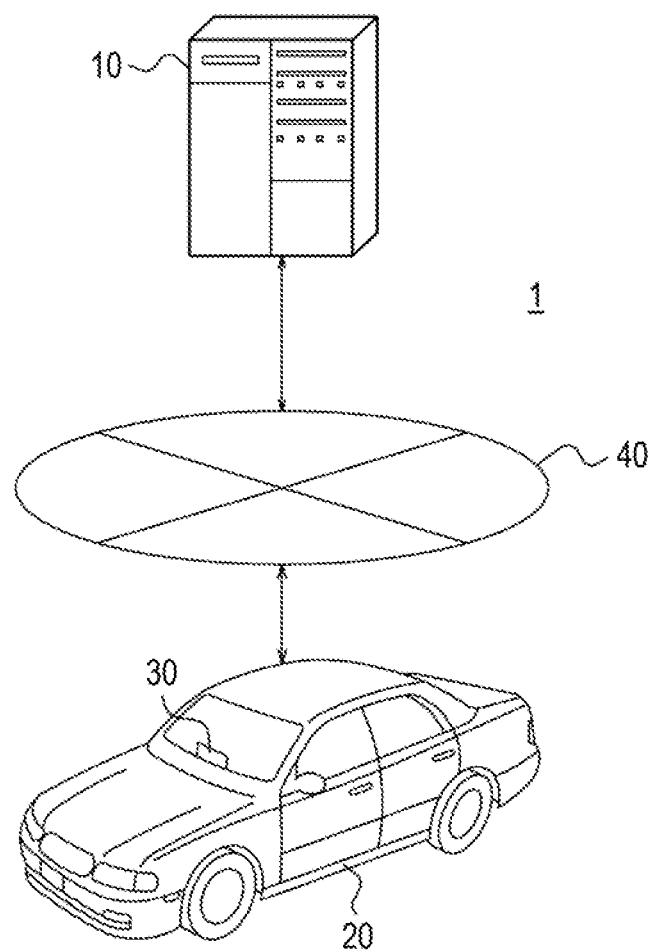
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and outline of the information processing system 1 according to the embodiment of the present disclosure will be described below with reference to FIG. 1.

The information processing system 1 includes an information processing device 10 and a navigation device 30 that is mounted in a vehicle 20. The information processing device 10 and the navigation device 30 are communicatively connected to each other via a network 40. The network 40 may be a network including a mobile communication network and the Internet.

In FIG. 1, the number of information processing devices 10, the number of vehicles 20, and the number of navigation devices 30 are respectively one, but the number of information processing devices 10, the number of vehicles 20, and the number of navigation devices 30 may be respectively two or more.

The information processing device 10 is, for example, a dedicated computer configured to serve as a server. The information processing device 10 may be a general-purpose personal computer (PC).

The information processing device 10 can communicate with the navigation device 30 via the network 40. The information processing device 10 acquires information of a current position of the vehicle 20 and information of a travelable range of the vehicle 20 from the navigation device 30. The information processing device 10 extracts a charging station located within the travelable range of the vehicle 20 from the position of the vehicle 20 out of a plurality of charging stations. The information processing device 10 extracts a spot which can be visited in a state in which the vehicle 20 stops in the extracted charging station. The information processing device 10 transmits information of the extracted spot to the navigation device 30 along with information of the extracted charging station.

The vehicle 20 is a vehicle that travels using a battery as an energy source. The vehicle 20 may be, for example, a hybrid vehicle (HV), a plug-in hybrid vehicle (PHV), or an electric vehicle (EV). The vehicle 20 is driven by a driver in this embodiment, but driving may be automated at an arbitrary level. The automation level may be, for example, any one of level 1 to level 5 in classification of the Society of Automotive Engineers (SAE). The vehicle 20 may be a vehicle dedicated for a mobility as a service (MaaS).

The navigation device 30 is mounted in the vehicle 20. The navigation device 30 may be an onboard dedicated car navigation device or may be an electronic device such as a smartphone or a tablet that can execute a navigation application. When a navigation application is executed by an electronic device such as a smartphone or a tablet, the electronic device such as a smartphone or a tablet may not be mounted in the vehicle 20. The electronic device such as a smartphone or a tablet may be used outside the vehicle 20.

Figure 2:
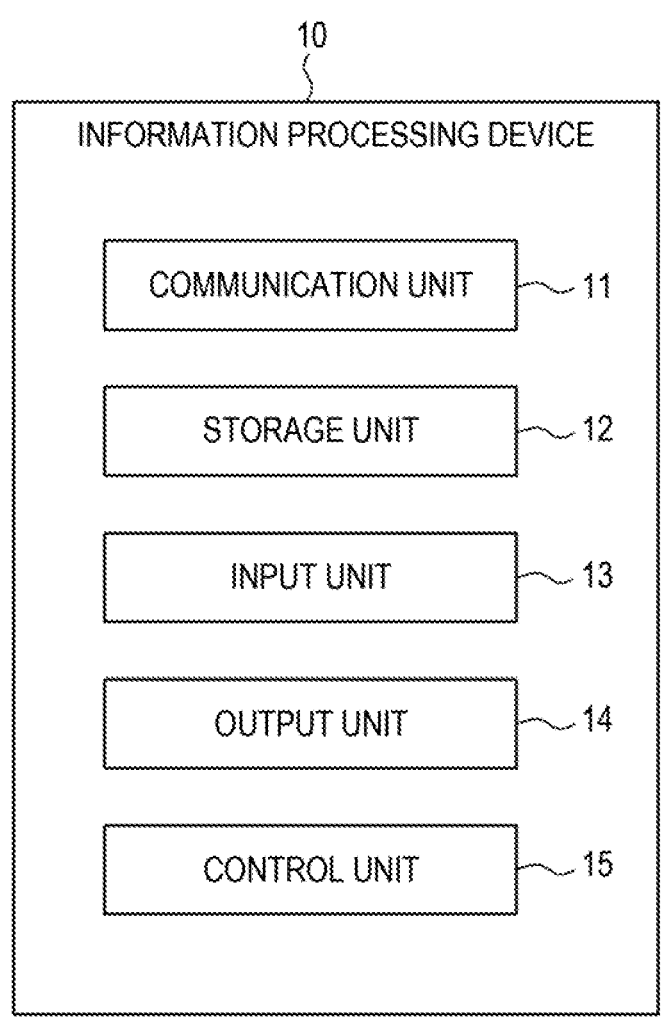
FIG. 2 is a block diagram illustrating a configuration of an information processing device according to the embodiment of the present disclosure.

The configuration of the information processing device 10 according to the embodiment of the present disclosure will be described below with reference to FIG. 2.

The information processing device 10 includes a communication unit 11, a storage unit 12, an input unit 13, an output unit 14, and a control unit 15.

The communication unit 11 includes a communication module that is connected to the network 40. For example, the communication unit 11 may include a communication module corresponding to a local area network (LAN). In this embodiment, the information processing device 10 is connected to the network 40 via the communication unit 11. The communication unit 11 transmits and receives various types of information via the network 40. The communication unit 11 can communicate with the navigation device 30 via the network 40.

The storage unit 12 is, for example, a semiconductor memory, a magnetic memory, or an optical memory, but is not limited thereto. The storage unit 12 may serve as, for example, a main storage device, an auxiliary storage device, or a cache storage device. The storage unit 12 stores arbitrary information which is used for operation of the information processing device 10. For example, the storage unit 12 may store a system program, an application program, and various types of information which is received by the communication unit 11. For example, information stored in the storage unit 12 may be updated with information which is received from the network 40 via the communication unit 11. A part of the storage unit 12 may be installed outside of the information processing device 10. In this case, the part of the storage unit 12 which is installed outside may be connected to the information processing device 10 via an arbitrary interface.

The input unit 13 includes one or more input interfaces that detect a user input and acquire input information based on a user's operation. For example, the input unit 13 may be a physical key, a capacitive key, a touch screen which is incorporated into a display of the output unit 14, or a microphone which receives a voice input, but is not limited thereto.

The output unit 14 includes one or more output interfaces that output information to notify a user. For example, the output unit 14 may be a display that outputs information as an image or a speaker that outputs information in a voice, but is not limited thereto.

The control unit 15 includes at least one processor, at least one dedicated circuit, or a combination thereof. The processor is a general-purpose processor such as a central processing unit (CPU) or a graphics processing unit (GPU) or a dedicated processor specialized in a specific process. The dedicated circuit is, for example, a field-programmable gate array (FPGA) or an application-specific integrated circuit (ASIC). The control unit 15 controls constituent units of the information processing device 10 such that they perform processes associated with the operation of the information processing device 10.

Figure 3:
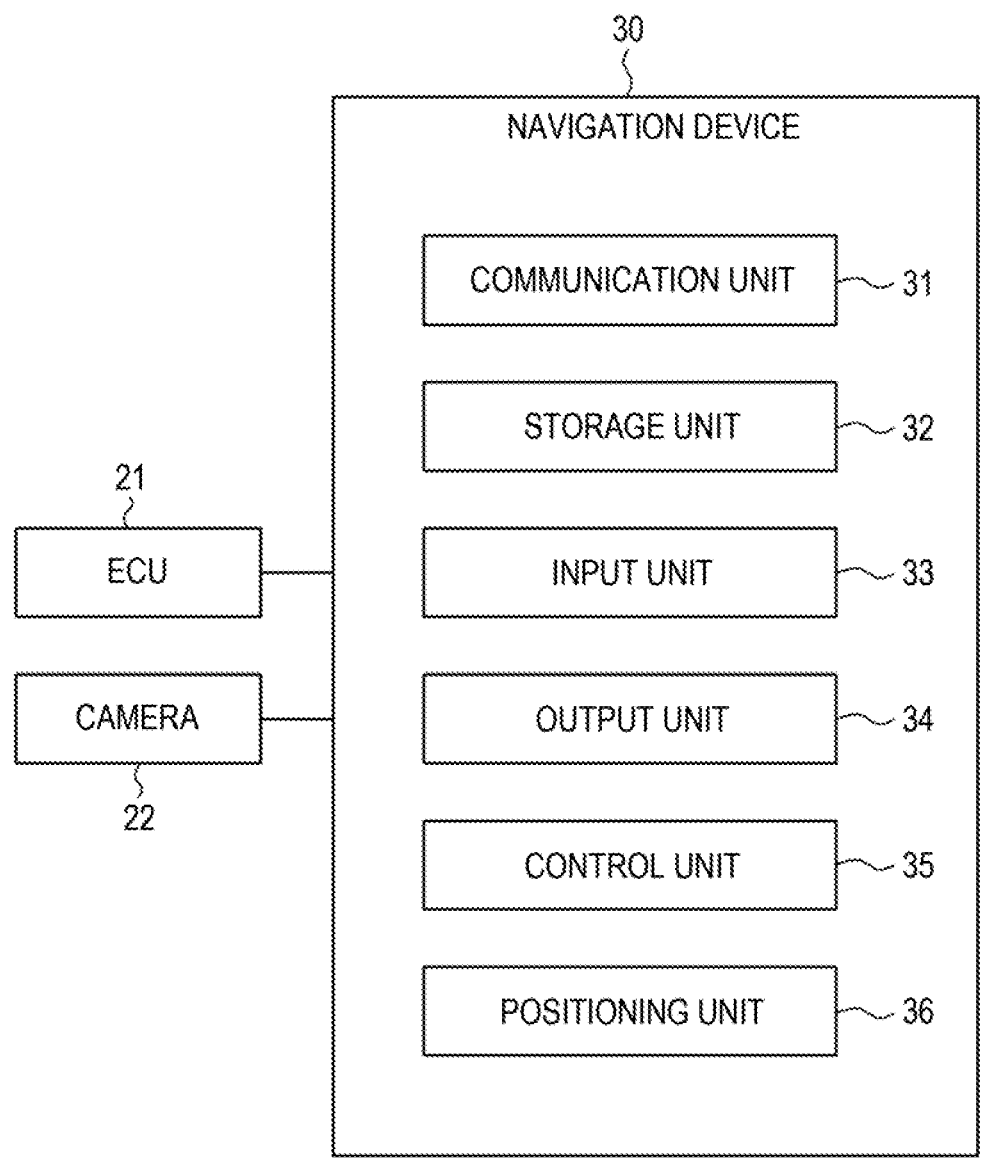
FIG. 3 is a block diagram illustrating a configuration of a navigation device according to the embodiment of the present disclosure.

The configuration of the navigation device 30 according to the embodiment of the present disclosure will be described below with reference to FIG. 3. An electronic control unit (ECU) 21 and the camera 22 which are communicatively connected to the navigation device 30 will also be described below with reference to FIG. 3. The ECU 21 and the camera 22 are mounted in the vehicle 20. In FIG. 3, one ECU 21 and one camera 22 are illustrated, but the number of ECUs 21 and the number of cameras 22 may be two or more.

The navigation device 30 includes a communication unit 31, a storage unit 32, an input unit 33, an output unit 34, a control unit 35, and a positioning unit 36.

The communication unit 31 includes a communication module that is connected to the network 40. The communication unit 31 may include, for example, a communication module corresponding to a mobile communication standard such as Long Term Evolution (LTE), 4th Generation (4G), or 5th Generation (5G). In this embodiment, the navigation device 30 is connected to the network 40 via the communication unit 31. The communication unit 31 transmits and receives various types of information via the network 40. The communication unit 31 can communicate with the information processing device 10 via the network 40.

The communication unit 31 also includes a communication module that is connected to the ECU 21 and the camera 22. For example, the communication unit 31 may include a communication module for an onboard network such as a controller area network (CAN). The communication unit 31 is communicatively connected to the ECU 21 and the camera 22 via an onboard network or a dedicated line.

The storage unit 32 is, for example, a semiconductor memory, a magnetic memory, or an optical memory, but is not limited thereto. The storage unit 32 may serve as, for example, a main storage device, an auxiliary storage device, or a cache storage device. The storage unit 32 stores arbitrary information which is used for operation of the navigation device 30. For example, the storage unit 32 may store a system program, an application program, and various types of information which is received by the communication unit 31. For example, information stored in the storage unit 32 may be updated with information which is received from the network 40 via the communication unit 31.

The input unit 33 includes one or more input interfaces that detect a user input and acquire input information based on a user's operation. For example, the input unit 33 may be a physical key, a capacitive key, a touch screen which is incorporated into a display of the output unit 34, or a microphone which receives a voice input, but is not limited thereto.

The output unit 34 includes one or more output interfaces that output information to notify a user thereof. For example, the output unit 34 may be a display that outputs information as an image or a speaker that outputs information in a voice, but is not limited thereto. In this embodiment, for example, the output unit 34 is a display.

The control unit 35 includes at least one processor, at least one dedicated circuit, or a combination thereof. The processor is a general-purpose processor such as a CPU or a GPU or a dedicated processor specialized in a specific process. The dedicated circuit is, for example, an FPGA or an ASIC. The control unit 35 controls constituent units of the navigation device 30 and performs processes associated with the operation of the navigation device 30.

The positioning unit 36 includes one or more receivers corresponding to an arbitrary satellite positioning system. For example, the positioning unit 36 may include a global positioning system (GPS) 30. The positioning unit 36 acquires a measured value of the position of the navigation device 30 as position information. The position information includes, for example, an address, latitude, longitude, and altitude. Since the navigation device 30 is mounted in the vehicle 20, the position information acquired by the positioning unit 36 may be position information of the vehicle 20.

The ECU 21 collects various types of information of the vehicle 20 and transmits the collected information to the navigation device 30. Information which is transmitted from the ECU 21 to the navigation device 30 includes, for example, information of a travelable range of the vehicle 20 and information of a battery residual capacity of a battery which is mounted in the vehicle 20. Thereafter, the "battery residual capacity of the battery mounted in the vehicle 20" may be simply referred to as a "battery residual capacity of the vehicle 20."

The camera 22 images the inside of the vehicle 20. The camera 22 may include an imaging device that images visible light or may include an imaging device that images radio waves other than visible light, such as infrared light. The camera 22 captures an image of an occupant who is in the vehicle 20. The camera 22 has a communication function and transmits the captured image to the navigation device 30.

Operation of Information Processing System

The operation of the information processing system 1 illustrated in FIG. 1 will be described below with reference to FIGS. 1 to 3.

The ECU 21 mounted in the vehicle 20 periodically collects information of a travelable range of the vehicle 20 and information of a battery residual capacity of the vehicle 20 and transmits the collected information to the navigation device 30. The travelable range of the vehicle 20 is a travelable distance which the vehicle 20 can travel with the current battery residual capacity of the vehicle 20.

The control unit 35 of the navigation device 30 acquires the information of the travelable range of the vehicle 20 and the information of the battery residual capacity of the vehicle 20 from the ECU 21 via the communication unit 31.

The control unit 35 transmits the information of the travelable range of the vehicle 20 and the information of the battery residual capacity of the vehicle 20 which are acquired from the ECU 21 to the information processing device 10 via the communication unit 31. The control unit 35 transmits information of the position of the vehicle 20 which is acquired by the positioning unit 36 to the information processing device 10 via the communication unit 31.

The control unit 35 acquires various types of information from the information processing device 10, the ECU 21, or the camera 22 via the communication unit 31, and description "via the communication unit 31" may be omitted in the below description. That is, in the following description, description that the control unit 35 acquires certain information from the information processing device 10, the ECU 21, or the camera 22 means that the control unit 35 acquires certain information which is received by the communication unit 31 from the information processing device 10, the ECU 21, or the camera 22.

The control unit 35 transmits various types of information to the information processing device 10 via the communication unit 31, and description "via the communication unit 31" may be omitted in the below description. That is, in the following description, description that the control unit 35 transmits certain information to the information processing device 10 means that the control unit 35 transmits certain information to the information processing device 10 via the communication unit 31.

The storage unit 12 of the information processing device 10 stores information on a plurality of charging stations. A charging station is a facility in which a charging device that can charge the battery of the vehicle 20 traveling using the battery as an energy source is installed. The storage unit 12 stores position information of a charging station, information of a type of a charging device installed in the charging station, and the like in correlation with each charging station.

The information processing device 10 can store information of a new charging station to the storage unit 12 or update information of the charging stations stored in the storage unit 12 by receiving an input of the information of the charging stations to the input unit 13 or by acquiring the information of the charging stations from a device that is connected to the network 40.

The control unit 15 of the information processing device 10 extracts a charging station which is located within the travelable range of the vehicle 20 from the position of the vehicle 20 out of a plurality of charging stations of which the information is stored in the storage unit 12 based on information of the position of the vehicle 20 and information of the travelable range of the vehicle 20 which are acquired from the navigation device 30.

The storage unit 12 of the information processing device 10 stores information of a spot which can be visited in a state in which the vehicle 20 stops in each charging station in correlation with each charging station. In this embodiment, a "spot" is facility or an implementation location of an event. When a spot is a facility, the spot of which information is stored in the storage unit 12 may be, for example, a restaurant, a coffee shop, a shopping mall, a park, a museum, an art gallery, and a sightseeing facility. When a spot is an implementation location of an event, the spot of which information is stored in the storage unit 12 may be, for example, an implementation location for a flea market, a festival, or fireworks.

The storage unit 12 of the information processing device 10 stores position information of a spot, a round-trip travel time between a charging station and the spot, and a stay time which is normally assumed for staying at the spot in correlation with each spot.

The information processing device 10 can store information of a new spot in the storage unit 12 or update information of the spots stored in the storage unit 12 by receiving an input of the information of the spots to the input unit 13 or by acquiring the information of the spots from a device that is connected to the network 40.

In this embodiment, a "spot which can be visited in a state in which the vehicle 20 stops" is a spot which can be visited in the state in which the vehicle 20 stops during charging of the battery of the vehicle 20 in the charging station. The time which it takes to charge the vehicle 20 generally ranges from about 10 minutes to several hours. A moving means during charging of the vehicle 20 is, for example, walking or public transportation means. Accordingly, a spot which can be visited without getting on the vehicle 20 during charging of the battery of the vehicle 20 in the charging station is, for example, a spot which can be visited by walking or public transportation means within a range of from about ten minutes to several hours.

The control unit 15 of the information processing device 10 calculates a charging time of the battery of the vehicle 20 based on information of a battery residual capacity of the vehicle 20 acquired from the navigation device 30 and a type of a charging device installed in the charging station. The time which it takes to charge the battery depends on a performance of the charging device. Accordingly, by also considering the type of a charging device in addition to the battery residual capacity in this way, the control unit 15 can accurately calculate the charging time of the battery of the vehicle 20.

When the charging time of the vehicle 20 is calculated, the control unit 15 may calculate a decrease in the battery residual capacity during movement from the position of the vehicle 20 to the charging station and calculate the charging time of the vehicle 20 based on the decrease in the battery residual capacity, information of the current battery residual capacity of the vehicle 20 acquired from the navigation device 30, and the type of the charging device installed in the charging station.

The control unit 15 calculates the time which it takes to visit the spot from the charging station based on a round-trip travel time between the charging station and the spot and a stay time at the spot. Alternatively, the time which it takes to visit the spot from the charging station may be stored in the storage unit 12 in advance.

When a charging station within the travelable range of the vehicle 20 from the position of the vehicle 20 is extracted, the control unit 15 extracts a spot which can be visited in a state in which the vehicle 20 stops in the charging station out of a plurality of spots of which information is stored in the storage unit 12. The control unit 15 extracts a spot in which the time which it takes to visit the spot from the charging station is shorter than the charging time of the battery of the vehicle 20 from the storage unit 12. For example, the control unit 15 may extract a spot in which a difference between the time which it takes to visit the spot from the charging station and the charging time of the battery of the vehicle 20 is equal to or less than a predetermined threshold value from the storage unit 12.

The control unit 15 transmits information of the spot extracted from the storage unit 12 to the navigation device 30 along with information of the extracted charging station.

When two or more spots are extracted, the control unit 15 may prioritize the spots based on a predetermined criterion. When information of the spots is transmitted to the navigation device 30, the control unit 15 may transmit the information of the spots to the navigation device 30 along with information of the prioritization.

The predetermined criterion which is used for the control unit 15 to prioritize the spots may be, for example, a criterion which is determined based on the charging time of the battery of the vehicle 20. For example, the control unit 15 may give higher priority to a spot as the time which it takes to visit the spot becomes closer to the charging time. Alternatively, the predetermined criterion may be, for example, a criterion which is determined based on evaluation points in a ranking site. For example, the control unit 15 may give higher priority to a spot as the number of evaluation points in the ranking site for the spot becomes higher. Alternatively, the predetermined criterion may be, for example, a criterion which is determined based on time periods. The control unit 15 may give higher priority to a spot which is suitable for a time period in which the vehicle 20 is charged such as giving higher priority to a restaurant in the time period of lunch time.

The predetermined criterion which is used for the control unit 15 to prioritize the spots may depend on, for example, the model of the vehicle 20 in which the navigation device 30 is mounted. For example, when the model of the vehicle 20 in which the navigation device 30 is mounted is a family model such as a minivan, the control unit 15 may give higher priority to a facility for family. Information of the model of the vehicle 20 in which the navigation device 30 is mounted may be transmitted from the navigation device 30 to the information processing device 10.

The predetermined criterion which is used for the control unit 15 to prioritize the spots may depend on, for example, characteristics of an occupant who is in the vehicle 20. The control unit 15 may estimate characteristics of an occupant who is in the vehicle 20 by acquiring an image inside of the vehicle 20 captured by the camera 22 mounted in the vehicle 20 and analyzing an image of an occupant included in the image. For example, the control unit 15 may estimate sex and age as characteristics of an occupant. For example, when an occupant in the vehicle 20 is estimated to be a male in his twenties, the control unit 15 may give higher priority to a facility for males in their twenties. When a plurality of occupants is included in the image inside of the vehicle 20, the control unit 15 may estimate what configuration the occupants form based on the results of estimation of sex and age of each occupant. The occupant configuration which is estimated by the control unit 15 is a family, a couple, a friendship, or the like. For example, when the occupant configuration of the vehicle 20 is a family, the control unit 15 may give higher priority to a facility for families.

The control unit 35 of the navigation device 30 acquires information of a charging station and information of a spot which is transmitted along with the information of the charging station from the information processing device 10.

Figure 4:
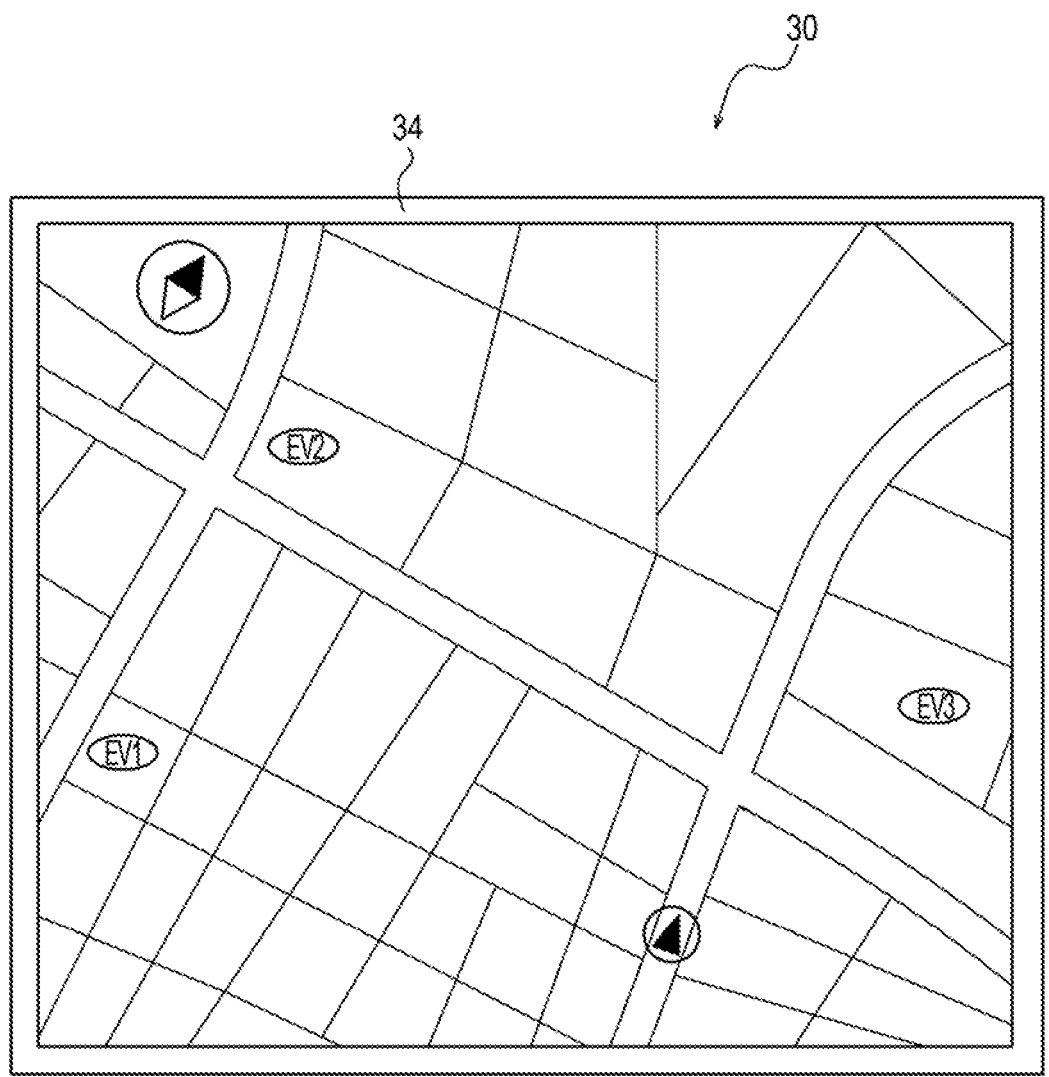
FIG. 4 is a diagram illustrating an example in which a charging station is displayed on the navigation device.

The control unit 35 may display the information of the charging station acquired from the information processing device 10 on the output unit 34. FIG. 4 illustrates an example in which the control unit 35 displays a charging station on the output unit 34. In FIG. 4, marks "EV1" to "EV3" indicate charging stations.

The control unit 35 may display information of a spot acquired from the information processing device 10 on the output unit 34. For example, when the input unit 33 receives an operation of selecting any one of the charging stations displayed on the output unit 34 through a touch operation or the like, the control unit 35 may display a spot which can be visited from the selected charging station on the output unit 34. When information of the prioritization is acquired along with the information of spots from the information processing device 10, the control unit 35 may display a spot with higher priority on the output unit 34 or display the spots in parallel in the descending order of priorities on the output unit 34.

Figure 5:
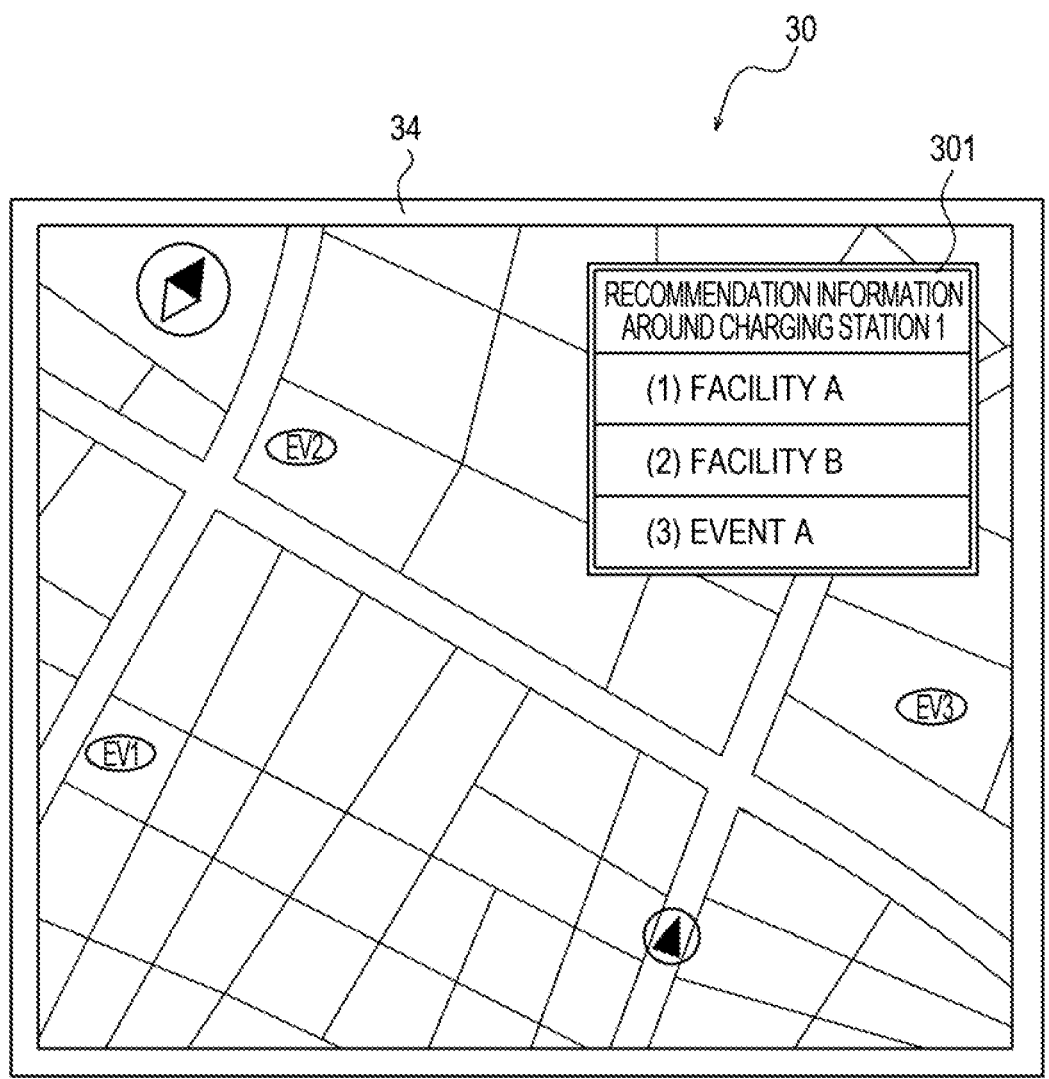
FIG. 5 is a diagram illustrating an example in which information of recommended spots is displayed on the navigation device.

FIG. 5 illustrates an example in which the control unit 35 of the navigation device 30 displays a recommended spot 301 on the output unit 34 in a pop-up display manner. FIG. 5 illustrates an example in which an operation of selecting a charging station indicated by "EV1" is received by the input unit 33.

When a spot is displayed on the output unit 34, the control unit 35 may display a distance from the charging station to the spot together. The distance from the current location to the spot may be calculated by the control unit 35.

In this way, when information of a charging station located within the travelable range and information of a spot which can be visited in a state in which the vehicle 20 stops in the charging station are acquired from the information processing device 10, the control unit 35 of the navigation device 30 displays the information of the charging station and the information of the spot on the output unit 34.

Operation of information processing system when destination is set

The operation of the information processing system 1 when a destination is set in the navigation device 30 will be described below.

The input unit 33 of the navigation device 30 receives an input of a destination from a user of the navigation device 30.

When the input unit 33 receives the input of a destination, the control unit 35 of the navigation device 30 retrieves a route to the destination based on information of the position of the vehicle 20 acquired by the positioning unit 36 and the input of the destination. The control unit 35 transmits information of the destination and information of the route to the destination to the information processing device 10.

The control unit 15 of the information processing device 10 acquires the information of the destination and the information of the route to the destination from the navigation device 30. When the information of the destination and the information of the route from the position of vehicle 20 to the destination are acquired, the control unit 15 extracts a charging station which is located within the travelable range of the vehicle 20 from the position of the vehicle 20 and located within a predetermined distance from the route to the destination out of a plurality of charging stations stored in the storage unit 12.

Figure 6:
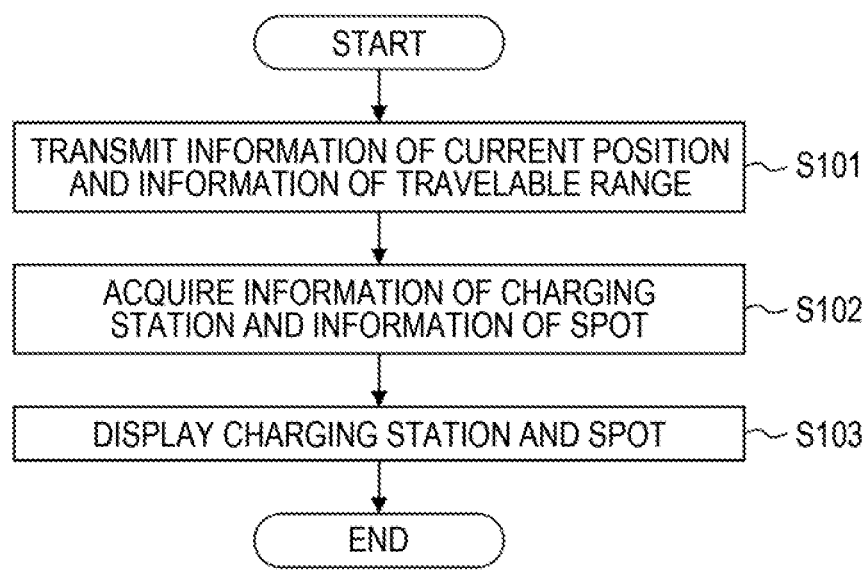
FIG. 6 is a flowchart illustrating an operation of the information processing system according to the embodiment of the present disclosure.
Figure 7:
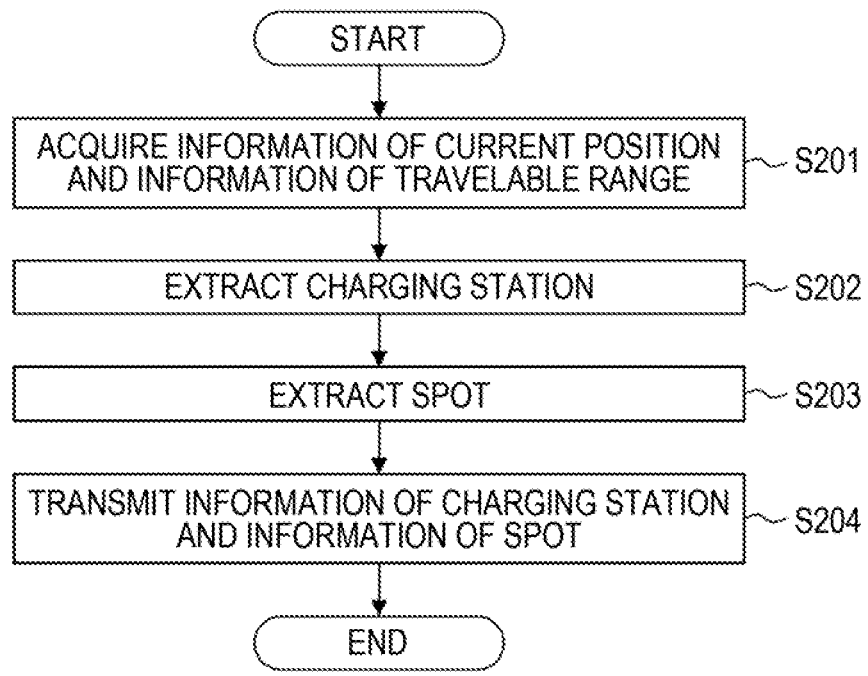
FIG. 7 is a flowchart illustrating an operation of the information processing system according to the embodiment of the present disclosure.

The operation of the information processing system 1 will be described below with reference to the flowcharts illustrated in FIGS. 6 and 7. FIG. 6 is a flowchart mainly illustrating the operation of the navigation device 30. FIG. 7 is a flowchart mainly illustrating the operation of the information processing device 10.

In Step S101 in FIG. 6, the control unit 35 of the navigation device 30 transmits information of the position of the vehicle 20 acquired by the positioning unit 36 to the information processing device 10. The control unit 35 transmits information of the travelable range of the vehicle 20 acquired from the ECU 21 to the information processing device 10.

In Step S201 in FIG. 7, the control unit 15 of the information processing device 10 acquires the information of the position and the information of the travelable range which are transmitted from the navigation device 30 in Step S101.

In Step S202 in FIG. 7, the control unit 15 of the information processing device 10 extracts a charging station which is located within the travelable range of the vehicle 20 from the position of the vehicle 20 out of a plurality of charging stations of which information is stored in the storage unit 12 based on the information of the position of the vehicle 20 and the information of the travelable range of the vehicle 20.

In Step S203 in FIG. 7, the control unit 15 of the information processing device 10 extracts a spot which can be visited in a state in which the vehicle 20 stops in the extracted charging station out of the plurality of spots of which information is stored in the storage unit 12.

In Step S204 in FIG. 7, the control unit 15 of the information processing device 10 transmits information of the spots extracted in Step S203 to the navigation device 30 along with information of the charging station extracted in Step S202.

In Step S102 in FIG. 6, the control unit 35 of the navigation device 30 acquires the information of the charging station and the information of the spot which are transmitted from the information processing device 10 in Step S204.

In Step S103 in FIG. 6, the control unit 35 of the navigation device 30 displays the charging station and the spot on the output unit 34.

As described above, in the information processing device 10 according to this embodiment, the control unit 15 extracts a charging station which is located within the travelable range of the vehicle 20 from the position of the vehicle 20 out of a plurality of charging stations. The control unit 15 extracts a spot which can be visited in a state in which the vehicle 20 stops in the extracted charging station out of a plurality of spots.

The control unit 15 transmits information of the extracted spot along with information of the extracted charging station. In this way, the information processing device 10 according to this embodiment can provide information of a spot which can be visited in a state in which the vehicle 20 stops in the charging station along with information of the charging station located within the travelable range of the vehicle 20. Accordingly, the information processing device 10 according to this embodiment can provide information allowing a driver to spend a waiting time in which the battery of the vehicle 20 such as an electric vehicle is charged meaningfully.

The present disclosure is not limited to the above embodiment. For example, a plurality of blocks illustrated in the block diagrams may be combined or a single block therein may be divided. Instead of performing a plurality of steps illustrated in the flowcharts in a time series which is described, the steps may be performed in parallel or in different order depending on processing capabilities of the devices performing the steps or according to necessity. In addition, the embodiment can be modified without departing from the gist of the present disclosure.

For example, some processing operations which are performed in the information processing device 10 in the above embodiment may be performed in the navigation device 30. Some processing operations which are performed in the navigation device 30 in the above embodiment may be performed in the information processing device 10.

For example, a configuration in which a general-purpose electronic device such as a computer serves as the information processing device 10 according to the above embodiment may be employed. Specifically, a program in which process details for realizing the functions of the information processing device 10 and the like according to the embodiment are described can be stored in a memory of the electronic device, and the program can be read and executed by a processor of the electronic device. Accordingly, the disclosure of the above embodiment can also be realized as a program which is executable by a processor.

For example, in the above embodiment, various types of information of the vehicle 20 collected by the ECU 21 are transmitted to the information processing device 10 via the communication unit 31 of the navigation device 30, but when the vehicle 20 includes a communication device which is separate from the navigation device 30, various types of information of the vehicle 20 collected by the ECU 21 may be transmitted to the information processing device 10 via the communication device.

For example, in the above embodiment, an image captured by the camera 22 is transmitted to the information processing device 10 via the communication unit 31 of the navigation device 30, but when the vehicle 20 includes a communication device which is separate from the navigation device 30, an image captured by the camera 22 may be transmitted to the information processing device 10 via the communication device.

For example, in the above embodiment, information of charging stations is stored in the storage unit 12 of the information processing device 10, but the information of charging stations may be stored in a device other than the storage unit 12. The information of charging stations may be stored, for example, in a database which is installed in a place other than the information processing device 10.

For example, in the above embodiment, information of spots is stored in the storage unit 12 of the information processing device 10, but the information of spots may be stored in a device other than the storage unit 12. The information of spots may be stored, for example, in a database which is installed in a place other than the information processing device 10.

What is claimed is:

1. An information processing device comprising:
    a database that stores information on a plurality of charging stations and information of a plurality of spots which can be visited without driving from the plurality of charging stations, wherein the plurality of spots are different from the plurality of charging stations;
    a control unit including at least one processor, programmed to:
        acquire, from a global positioning system (GPS), information including latitude and longitude of a current position of the vehicle which is traveling using a battery as an energy source;
        acquire, from the vehicle, information of a travelable range of the vehicle based on a battery residual capacity of the battery of the vehicle;
        extract, from the database, at least one charging station, located within the travelable range from the latitude and longitude of the current position, out of the plurality of charging stations;
        extract, from the database, two or more spots from among the plurality of spots for each one of said at least one extracted charging station, which are able to be visited by a vehicle occupant without driving in the vehicle while the vehicle is in a stopped state in each one of the at least one extracted charging station;
        based upon the two or more spots being extracted, prioritize the two or more extracted spots with respect to each other based upon a predetermined criteria;
        transmit, to a navigation device mounted in the vehicle, information of the two or more extracted spots along with information of the at least one extracted charging station; and
        control the navigation device to display, at a same time, information for the at least one extracted charging station and prioritized information for the two or more extracted spots that are associated with the at least one extracted charging station,
    wherein the predetermined criteria for prioritizing the two or more spots includes a model of the vehicle in which the navigation device is mounted.

2. The information processing device according to claim 1, wherein the control unit is programmed to:
    calculate a charging time of the battery based on a type of a charging device which is installed in the at least one extracted charging station and the battery residual capacity; and
    the two or more spots are extracted based on the charging time.

3. The information processing device according to claim 2, wherein the control unit is programmed to determine whether the two or more spots are able to be visited in the charging time based on a time which it takes to visit the two or more spots from the at least one extracted charging station.

4. The information processing device according to claim 3, wherein the control unit is programmed to calculate the time which it takes to visit the two or more spots based on a round-trip travel time between the at least one extracted charging station and the two or more spots and a stay time at the two or more spots.

5. The information processing device according to claim 1, wherein the control unit is programmed to extract the at least one charging station which is located within the travelable range from the position of the vehicle and located within a predetermined distance from a route from the position of the vehicle to a destination of the vehicle out of the plurality of charging stations when information of the destination and information of the route are acquired.

6. The information processing device according to claim 1, wherein the predetermined criteria for prioritizing the two or more spots further includes characteristics of an occupant in the vehicle.

7. An information processing system comprising:
    the information processing device according to claim 1; and
    the navigation device that is mounted in the vehicle.

8. A non-transitory storage medium storing a program for causing a computer to perform operations including:
    acquiring, from a global positioning system (GPS), information including latitude and longitude of a current position of the vehicle which is traveling using a battery as an energy source;
    acquiring, from the vehicle, information of a travelable range of the vehicle based on a battery residual capacity of the battery of the vehicle;
    extracting, from a database, at least one charging station, located within the travelable range from the latitude and longitude of the current position, out of a plurality of charging stations stored in the database;
    extracting, from the database, two or more spots from among the plurality of spots for each one of said at least one extracted charging station, which are able to be visited by a vehicle occupant without driving in the vehicle while the vehicle is in a stopped state in each one of the at least one extracted charging station;

based upon the two or more spots being extracted, prioritizing the two or more extracted spots with respect to each other based upon a predetermined criteria;

transmitting, to a navigation device mounted in the vehicle, information of the two or more extracted spots along with information of the at least one extracted charging station; and controlling the navigation device to display, at a same time, information for the at least one extracted charging station and prioritized information for the two or more extracted spots that are associated with the at least one extracted charging station, wherein the predetermined criteria for prioritizing the two or more spots includes a model of the vehicle in which the navigation device is mounted.

9. The non-transitory storage medium storing the program according to claim 8, further comprising:

calculating a charging time of the battery based on a type of a charging device which is installed in the at least one extracted charging station and the battery residual capacity; and extracting the two or more spots based on the charging time.

10. The non-transitory storage medium storing the program according to claim 9, wherein the extracting of the two or more spots which are able to be visited out of the plurality of spots includes determining whether the two or more spots are able to be visited in the charging time based on a time which it takes to visit the two or more spots from the at least one extracted charging station.

11. The non-transitory storage medium storing the program according to claim 10, wherein the determining of whether the two or more spots are able to be visited in the charging time includes calculating the time which it takes to visit the two or more spots based on a round-trip travel time between the at least one extracted charging station and the two or more spots and a stay time at the two or more spots.

12. The non-transitory storage medium storing the program according to claim 8, further comprising:

acquiring information of a destination of the vehicle and information of a route to the destination; and wherein the extracting the at least one charging station out of the plurality of charging stations, is further based on being located within a predetermined distance from the route.

13. An information processing method in an information processing device, comprising:

acquiring, from a global positioning system (GPS), information including latitude and longitude of a current position of the vehicle which is traveling using a battery as an energy source;

acquiring, from the vehicle, information of a travelable range of the vehicle based on a battery residual capacity of the battery of the vehicle;

extracting, from a database, at least one charging station, located within the travelable range from the latitude and longitude of the current position, out of a plurality of charging stations stored in the database;

extracting, from the database, two or more spots from among the plurality of spots for each one of said at least one extracted charging station, which are able to be visited by a vehicle occupant without driving in the vehicle while the vehicle is in a stopped state in each one of the at least one extracted charging station;

based upon the two or more spots being extracted, prioritizing the two or more extracted spots with respect to each other based upon a predetermined criteria; transmitting, to a navigation device mounted in the vehicle, information of the two or more extracted spots along with information of the at least one extracted charging station; and controlling the navigation device to display, at a same time, information for the at least one extracted charging station and prioritized information for the two or more extracted spots that are associated with the at least one extracted charging station, wherein the predetermined criteria for prioritizing the two or more spots includes a model of the vehicle in which the navigation device is mounted.

14. The information processing method according to claim 13, further comprising:

calculating a charging time of the battery based on a type of a charging device which is installed in the at least one extracted charging station and the battery residual capacity; and extracting the two or more spots based on the charging time.

15. The information processing method according to claim 14, wherein the extracting of the two or more spots which are able to be visited out of the plurality of spots includes determining whether the two or more spots are able to be visited in the charging time based on a time which it takes to visit the two or more spots from the at least one extracted charging station.

16. The information processing method according to claim 15, wherein the determining of whether the two or more spots are able to be visited in the charging time includes calculating the time which it takes to visit the two or more spots based on a round-trip travel time between the at least one extracted charging station and the two or more spots and a stay time at the two or more spots.

17. The information processing method according to claim 13, further comprising:

acquiring information of a destination of the vehicle and information of a route to the destination; and wherein the extracting the at least one charging station out of the plurality of charging stations, is further based on being located within a predetermined distance from the route.

* * * * *